US011315177B2

(12) United States Patent
Furbish et al.

(10) Patent No.: US 11,315,177 B2
(45) Date of Patent: Apr. 26, 2022

(54) BIAS PREDICTION AND CATEGORIZATION IN FINANCIAL TOOLS (71) Applicant: Intuit Inc., Mountain View, CA (US)

(72) Inventors: Kevin Furbish, Tampa, FL (US); Nirmala Ranganathan, San Jose, CA (US); Aaron Dibner-Dunlap, Mountain View, CA (US); Sumayah Rahman, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 80 days.

(21) Appl. No.: 16/429,119

(22) Filed: Jun. 3, 2019

(65) Prior Publication Data
US 2020/0380597 A1 Dec. 3, 2020

(51) Int. Cl.
*G06Q 40/02* (2012.01)
(52) U.S. Cl.
CPC .................... *G06Q 40/02* (2013.01)
(58) Field of Classification Search
CPC ......... G06Q 40/02; G06Q 40/06; G06Q 40/08
See application file for complete search history.

(56) References Cited

U.S. PATENT DOCUMENTS

| | | | | |
|---|---|---|---|---|
| 5,644,727 A * | 7/1997 | Atkins | ................. | G06Q 20/102 |
| | | | | 705/40 |
| 6,430,539 B1 * | 8/2002 | Lazarus | ................. | G06Q 30/02 |
| | | | | 705/14.1 |
| 8,583,408 B2 * | 11/2013 | Laxmanan | ............. | G06Q 10/06 |
| | | | | 703/6 |
| 10,169,330 B2 * | 1/2019 | Misra | ..................... | G06F 40/211 |
| 10,936,627 B2 * | 3/2021 | Jennings | ............... | G06F 16/285 |
| 2006/0241923 A1 * | 10/2006 | Xu | ......................... | G06Q 40/08 |
| | | | | 703/2 |

(Continued)

FOREIGN PATENT DOCUMENTS

| | | | | |
|---|---|---|---|---|
| KR | 20110090939 A | * | 8/2011 | ............. G06N 20/00 |
| WO | WO 2010/006345 | | 1/2010 | |

(Continued)

OTHER PUBLICATIONS

Understanding and Controlling the Membership Degrees in Fuzzy Clustering (Year: 2005).*

(Continued)

*Primary Examiner* — Bennett M Sigmond
*Assistant Examiner* — James H Miller
(74) *Attorney, Agent, or Firm* — DLA Piper LLP (US)

(57) ABSTRACT

A processor may obtain financial data for a user. The processor may process the financial data to generate feature data indicative of at least one feature. The processor may compare the at least one feature to at least one threshold value to determine that the user has a cognitive bias affecting a financial preference of the user and associated with the at least one threshold value. The at least one threshold value may denote a threshold for membership in a cluster of unlabeled users having the cognitive bias. In response to the comparing, the processor may identify a change applicable to a financial account of the user. The change may be associated with the cognitive bias. The processor may automatically cause the change to be implemented by a network-accessible financial service.

12 Claims, 5 Drawing Sheets

(56) References Cited

U.S. PATENT DOCUMENTS

| | | | |
|---|---|---|---|
| 2007/0226099 A1* | 9/2007 | Senturk-Doganaksoy | G06F 17/18 705/35 |
| 2009/0276368 A1* | 11/2009 | Martin | G06Q 40/02 705/36 R |
| 2010/0070430 A1* | 3/2010 | Fawas | G06Q 40/02 705/36 R |
| 2011/0071969 A1* | 3/2011 | Doctor | G05B 13/0275 706/15 |
| 2011/0251978 A1* | 10/2011 | Davies | G06Q 40/00 705/36 R |
| 2014/0096249 A1* | 4/2014 | Dupont | G06F 21/00 726/23 |
| 2014/0201063 A1* | 7/2014 | Snell | G06F 16/245 705/38 |
| 2016/0034932 A1* | 2/2016 | Sion | G06Q 30/0218 705/14.1 |
| 2017/0134401 A1* | 5/2017 | Medvedovsky | H04L 63/1458 |
| 2017/0270428 A1* | 9/2017 | Zoldi | G06Q 30/06 |
| 2017/0293625 A1* | 10/2017 | Nachlieli | G06F 16/287 |
| 2020/0134484 A1* | 4/2020 | Hazard | G06N 5/045 |

FOREIGN PATENT DOCUMENTS

| | | | | |
|---|---|---|---|---|
| WO | WO-2010006345 A1 * | 1/2010 | | G06Q 40/08 |
| WO | WO-2015001416 A1 * | 1/2015 | | G06K 9/6223 |
| WO | WO-2020036590 A1 * | 2/2020 | | G06N 7/005 |

OTHER PUBLICATIONS

What Are T Values and P Values in Statistics? (Year: 2016).*
Using Fuzzy c-mean cluster algorithm in financial health scoring (Year: 2017).*
Gokten, Pinar Okan, Furkan Baser, and Soner Gokten. "Using fuzzy c-means clustering algorithm in financial health scoring." The Audit Financiar Journal 15, No. 147 (2017): 385-385 (Year: 2017).*
Arabie, Ph, Newark D. Baier, Cottbus F. Critchley, and Milton Keynes. "Studies in Classification, Data Analysis, and Knowledge Organization." (2006) (Year: 2006).*
International Search Report dated Sep. 23, 2019 ssued International Applicatio No. PCT/US2019/043787.
Written Opinion dated Sep. 23, 2019 ssued International Applicatio No. PCT/US2019/043787.

* cited by examiner

BIAS PREDICTION AND CATEGORIZATION IN FINANCIAL TOOLS

DETAILED DESCRIPTION OF SEVERAL EMBODIMENTS

Embodiments described herein may be configured to infer a user's personality and/or cognitive biases and automatically adjust financial account settings and/or options based thereon. Many users may have one or more computer-accessible financial accounts providing various options for spending, saving, transferring, and/or investing money and/or other forms of value. However, many users may not know what set of options would best help them in their current financial situation or which options they should prioritize. For example, some users may have one or more personality traits and/or biases that may affect their understanding of financial management and/or that may affect some financial goals. As a result, a user may simply fail to act, or may act differently from how they should have to most effectively use their money. The disclosed systems and methods may reduce occurrences of and/or mitigate effects from such mismatches between the benefits offered by financial accounts and the perceived relevance of the benefits to the user. For example, disclosed systems and methods may determine personality and/or cognitive biases for a user from which the disclosed systems and methods may create personalized solutions which users may be more likely to adopt. In some embodiments, the biases may be identified partially or entirely from user financial data, thereby avoiding the requirement for costly and error prone user surveys or questionnaires.

Disclosed systems and methods may provide financial advice to users that may correspond to their biases while avoiding providing generalized financial advice that may not be well-suited to them. One example recommendation may suggest automated, system-driven transfers to savings with variable access capabilities. This recommendation may be ideal for a person with present bias, who requires an extra push to plan for long-term goals. However, a person who does not have present bias may view automated saving as unnecessary because they may find it easy to save for the long term and may prefer the ownership of making manual transfers to their savings account. Therefore, understanding cognitive biases and personality traits may allow for targeted recommendations to users that match their mindsets. In some embodiments, the disclosed systems and methods may automatically implement recommended courses of action based on user biases.

An example process for determining a user's biases and personalizing their finances based on the biases may proceed as follows. A system may define one or more observed features of a user (e.g., traits of the user that may indicate some personal characteristic of the user (age, gender, salary, etc.) and/or behaviors of the user that may indicate some personal characteristic of the user (e.g., pays bills on time, spends X per month on Y item, etc.). These features may correlate with biases (e.g., tendencies of the user to prefer certain types of things, such as risky financial investments or more stable, but less yielding, financial investments). Using data from a plurality of users, the system may build one or more models of financial activity patterns of users having those biases. For a particular user, the system may gather data about current and/or historical financial situation (e.g., debt, savings, investments, retirement plans, income pattern, spending pattern, resiliency to financial shock, etc.). The system may analyze the gathered data against the models to determine the user's biases. Based on the determined biases, the system may personalize financial account optimizations (e.g., advice, tips, offers, products, etc.). This process, the system that performs the process, and variations thereon are described in detail below.

Figure 1:
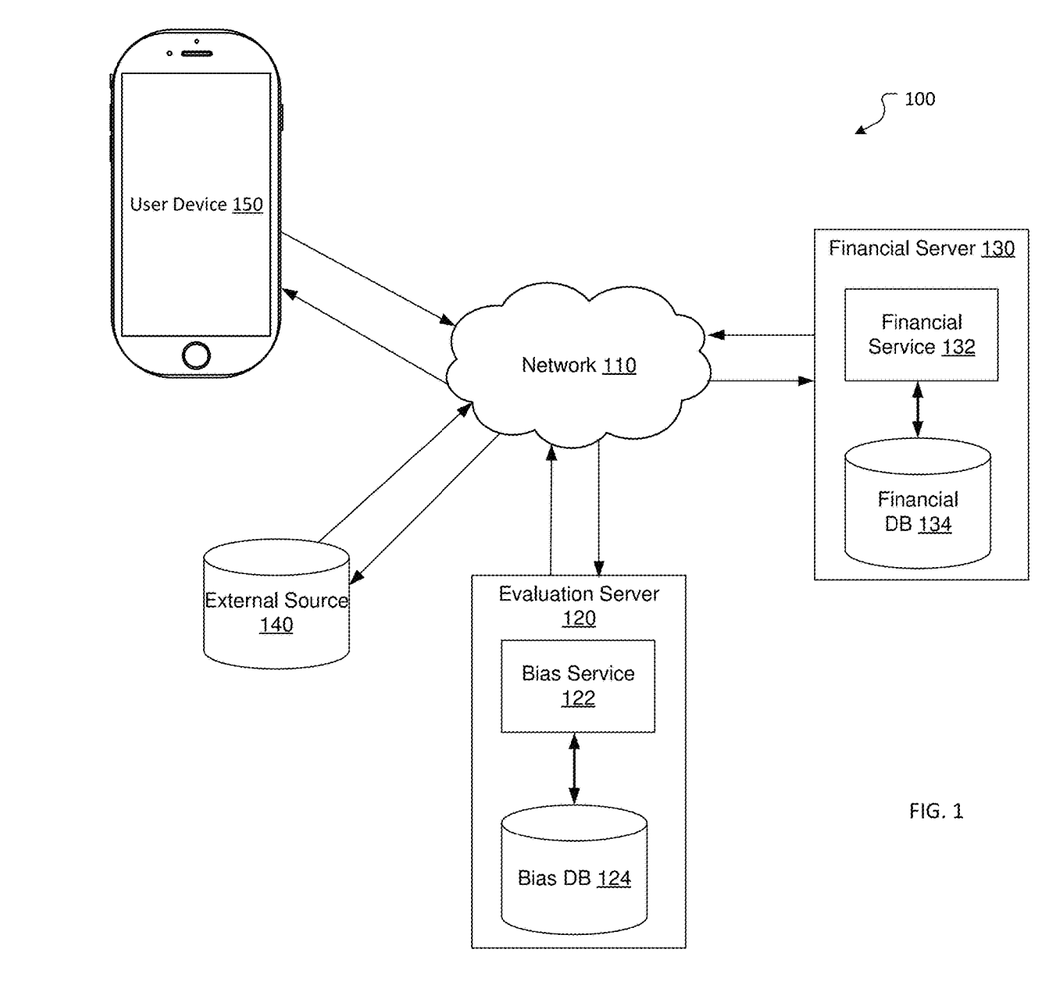
FIG. 1 shows a system configured to evaluate a user's biases and/or adjust a user's financial settings according to an embodiment of the present disclosure.

FIG. 1 shows a system 100 configured to evaluate a user's values and/or adjust a user's financial settings according to an embodiment of the present disclosure. System 100 may include evaluation server 120, financial server 130, and/or user device 150. Network 110 may be the Internet and/or other public or private networks or combinations thereof. Evaluation server 120, financial server 130, and/or user device 150 may be configured to communicate with one another through network 110. For example, communication between the elements may be facilitated by one or more application programming interfaces (APIs). APIs of system 100 may be proprietary and/or may be examples available to those of ordinary skill in the art such as Amazon® Web Services (AWS) APIs or the like.

Evaluation server 120 may be configured to gather data about a user (e.g., from financial server 130, user device 150, and/or one or more external sources 140 which may be available through network 110), evaluate the data, and determine how to adjust user financial account settings based on the evaluating. Evaluation server 120 may include bias service 122, which may be configured to collect and process the data, and bias database 124, which may be configured to store the collected data and/or the outcome of the processing by bias service 122. Detailed examples of the data gathered, the processing performed, and the results generated are provided below.

Evaluation server 120 may communicate with financial server 130 to effect changes in the user's financial account settings. For example, financial server 130 may include financial service 132, which may be configured to process user account changes and/or to generate change suggestions for presentation to the user (e.g., by sending to user device 150) based on data from bias service 122. Financial server 130 may include financial database 134, which may store account settings and modifications thereto and/or may store offers that may be presented to the user. Detailed examples of the settings, modifications, and offers are provided below.

User device 150 may be any device configured to present user interfaces and receive inputs thereto. For example, user device 150 may be a smartphone, personal computer, tablet, laptop computer, or other device. User device 150 may present suggestions for modifying financial settings from bias service 122 and/or financial service 132 for acceptance by the user, requests to confirm automatically adjusted financial settings from bias service 122 and/or financial service 132, and/or other information. Detailed examples of the data exchanged between user device 150 and other system 100 elements are provided below.

Evaluation server 120, financial server 130, external source 140, and user device 150 are each depicted as single devices for ease of illustration, but those of ordinary skill in the art will appreciate that evaluation server 120, financial server 130, external source 140, and/or user device 150 may be embodied in different forms for different implementations. For example, evaluation server 120, and/or financial server 130 may include a plurality of servers. Alternatively, the operations performed by evaluation server 120 and/or financial server 130 may be performed on a single server. In another example, a plurality of user devices 150 may communicate with evaluation server 120 and/or financial server 130. A single user may have multiple user devices 150, and/or there may be multiple users each having their own user device(s) 150. Any number and/or type of external sources 140 may be available through network 110 and, as described below, may include sources such as social media and/or location data providers.

Figure 2:
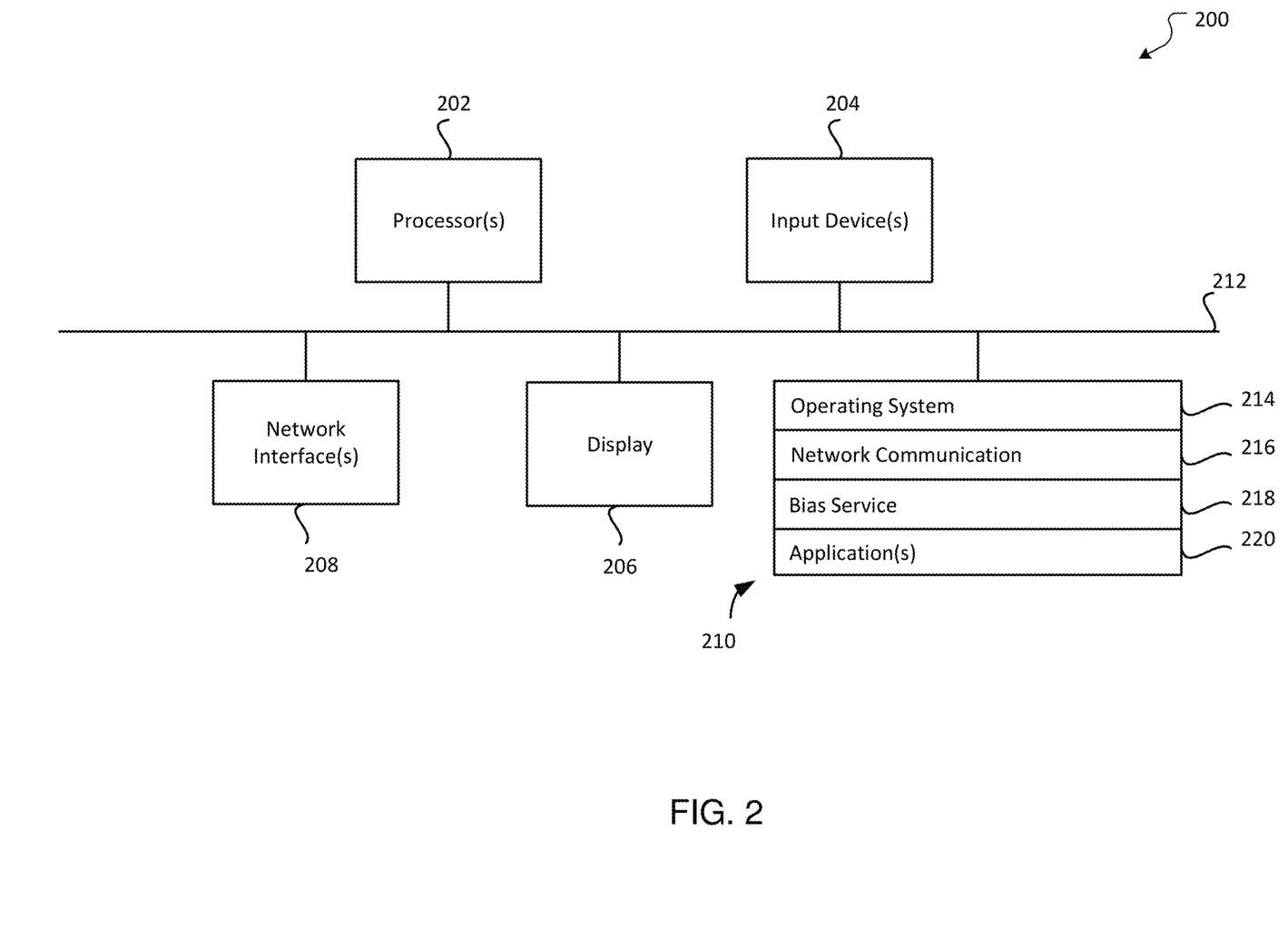
FIG. 2 shows a server device according to an embodiment of the present disclosure.

FIG. 2 is a block diagram of an example computing device 200 that may implement various features and processes as described herein. For example, computing device 200 may function as evaluation server 120, financial server 130, external source 140, or a portion or combination thereof in some embodiments. The computing device 200 may be implemented on any electronic device that runs software applications derived from compiled instructions, including without limitation personal computers, servers, smart phones, media players, electronic tablets, game consoles, email devices, etc. In some implementations, the computing device 200 may include one or more processors 202, one or more input devices 204, one or more display devices 206, one or more network interfaces 208, and one or more computer-readable mediums 210. Each of these components may be coupled by bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Bias service instructions 218 may include instructions that generate and evaluate user data and implement financial account optimizations based thereon as described herein.

Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
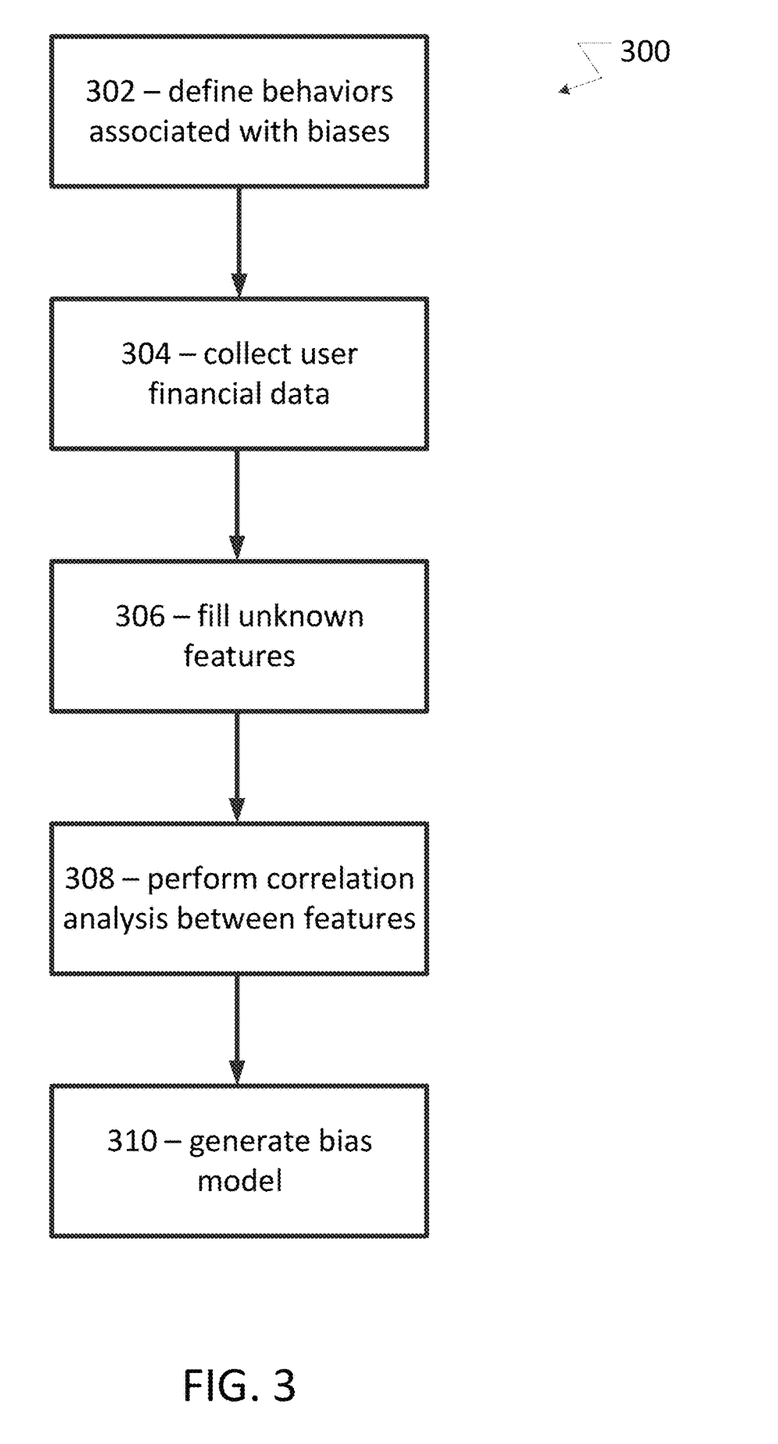
FIG. 3 shows a bias model creation process according to an embodiment of the present disclosure.

FIG. 3 shows a bias model creation process 300 according to an embodiment of the present disclosure. Evaluation server 120 may perform process 300 to build bias models from real-world user data. In order to identify cognitive biases and personality traits in users from a limited set of data (e.g., from only their financial data, which may include their transaction history, account balances, credit history, and debt), evaluation server 120 may engineer features to represent these financial behaviors and/or any other feature that is hypothesized to be associated with the trait of interest. Specifically, evaluation server 120 may define traits or features that may be indicative of bias and may gather and process user data from a plurality of users to identify behaviors that may correlate with these features. Evaluation server 120 may build models from the user data, and these models may be used to evaluate individual users in subsequent processing.

For example, as described below, evaluation server 120 may apply an unsupervised learning method to features engineered from financial data. The features may represent traits that are associated with a behavioral bias of interest. By optimizing the machine learning model for maximum differentiation between sets of users in regard to the financial traits that are known to be associated with the behavioral bias, evaluation server 120 may produce a predictive model that may be used to determine the extent to which a user has a particular cognitive bias or personality trait affecting one or more financial preferences of the user. The following example is presented as developing a model for present bias, which may be defined as the tendency to favor immediate rewards over long term gains. However, process 300 may be applied to build models for any biases that may affect financial decisions. For example, process 300 may be used to build models for loss aversion, risk aversion, ambiguity aversion, probability estimation, personality (e.g., conscientiousness, neuroticism, openness to experience, extroversion, agreeableness, etc.), and/or other biases.

At 302, evaluation server 120 may define one or more behaviors associated with one or more biases. The behaviors may be exhibited through features (e.g., confident features, hypothesized features, and/or general features which are described in detail below), and each feature may be described by feature data. For example, bias service 122 may receive feature data describing one or more predefined behavioral traits that may be significantly associated with a bias for which a model is being developed. In the example of present bias, the predefined traits may include late or missed payments on debt and/or an increase in spending immediately after receiving a paycheck. These traits may be referred to as "confident features," because bias service 122 may be confident that they are associated with the trait of interest, present bias, based on statistically rigorous behavioral economics research that has been documented.

While present bias and the aforementioned confident features are used as examples in some embodiments herein, other traits which may have other confident features may be evaluated using the disclosed systems and methods. For example, a loss aversion cognitive bias may indicate a person's tendency to prefer avoiding losses over acquiring equivalent gains. Some examples of confident features that may be associated with loss aversion, based on research, may include a reluctance to purchase more durable items and/or underinvestment in stocks. Another example cognitive bias may be neuroticism, which may be associated with confident features such as low risk seeking, likelihood of financial distress, and compulsive buying behavior.

Not all users may necessarily display the confident features. For example, with present bias, only a small fraction of users may display the two confident features, while a greater proportion of the population may actually have present bias. Accordingly, bias service 122 may receive feature data describing more than the two confident features. Since a bias, such as present bias, may manifest itself in a user's financial life in different ways, bias service 122 may generate additional features that may represent alternative manifestations of the bias. The additional features may be selected hypothetically, in some cases without concrete statistical correlation existing at the time of selection. These traits may be referred to as "hypothesized features." Because these features may later be validated through correlation analysis as described below, any features hypothesized to be associated with a bias may be compiled. The ideas for features may be generated through expert recommendations and user interviews, for example. Some example hypothesized features for present bias may include lifestyle inflation, proportional spending on discretionary expenses, discretionary expense volatility, proportional spending on short-term consumables, saving to interest ratio, debt paydown style, save to spend ratio, and/or savings volatility. As noted above, while present bias is presented as an example herein, other biases may be evaluated, each of which may have other hypothesized features. For example, some hypothesized features for loss aversion may include real estate ownership and/or usage of credit cards or debit cards as opposed to cash when making purchases.

In some embodiments, hypothesized features may be identified by experts in behavioral economics identifying the various traits that a person with a particular bias is likely to display, with a focus on the financial traits that may be inferred from the financial data gathered as described herein. In some embodiments, hypothesized features may be identified by receiving feedback from users who have or do not have a particular bias or personality trait of interest. For example, these users may answer a series of questions relating to their financial life and how they make financial decisions. In some cases, users may be asked to rank likelihood of making given financial decisions (e.g., on a 1-5 scale or a 1-10 scale or the like). For example, a user may rank purchasing a stock that is risky but has a chance of rapid growth in value with a 9 (indicating very likely to make the purchase), and purchasing a stock that is stable but slow growing with a 2 (indicating not likely to make the purchase). If the users with the bias of interest indicate financial behaviors that might be linked to the bias, then these behaviors may be used as hypothesized features. For example, the user who ranked the risky stock a 9 and the stable stock a 2 may have a bias towards risk taking, and the behavior of buying risky stock may be used as a hypothesized risk taking bias feature, whereas the behavior of buying stable stock may not be used as a hypothesized risk taking bias feature.

At 304, evaluation server 120 may collect financial data from a plurality of users. For example, the users may be users of financial software and/or financial account access tools. In some embodiments, a user may be an individual and/or a grouping of individuals who make financial decisions together (e.g., a household and/or family). In addition to features hypothesized to be associated with present bias, it may be possible that completely unrelated financial traits are predictors of present bias. Therefore, a general financial trait dataset based on general features may be gathered. Bias service 122 may gather general features such as financial data (e.g., tax data, transaction data, credit report data, etc.) from financial server 130 and/or external source 140. Data gathering may include interfacing with financial service 132 and/or external source 140 using one or more APIs, for example. In some embodiments, bias service 122 may gather data from multiple sources for a given user, which may allow bias service 122 to corroborate data (e.g., verify that a payment recorded in transaction data is also present in credit report data) and/or to fill in as much data about the user as possible (e.g., because one source may be missing data that another source may have). These users may be unlabeled users, in that they may not be associated with any clusters or biases when the data is collected, and process 300 may label the users according to the processing described below.

In a specific example, bias service 122 may communicate with financial service 132 to obtain data from financial service 132 that may include expense and transaction details (e.g., receipt level explanation of what goods or services were purchased in a transaction). In some embodiments, bias service 122 may gather the expense and transaction details from other sources (e.g., by communicating with user device 150 having a financial application installed thereon (e.g. PayPal, Venmo, Square, bitcoin wallets, etc.) and/or by communicating with external source 140 storing financial data). Financial institutions and/or applications may record transactions associated with user accounts (e.g., checking accounts, credit card accounts, or the like). The records of the transactions may include not only an amount paid by the user, but also a name of the payee and/or a category of goods and/or services provided by the payee. The categories may include restaurants, bars, grocery stores, gas, travel-related expenses, hotels, events/venues, various types of goods, etc.

Financial data is gathered in this example, but in some embodiments, bias service 122 may gather other general feature data in addition to or instead of financial data, such as health data, social media data, traveling behavior data, etc. For example, bias service 122 may gather data about the user from external source 140 and/or user device 150 through network 110. Data gathering may include interfacing with external source 140 using one or more APIs, for example. Data gathering may include collecting data by one or more local processes of user device 150, which may then send the data to bias service 122, for example. The data may include appointments from calendars, emails, and/or other data from user device 150 The data may include social network data about the user and/or more general data such as government statistics and/or third-party suppled data about cost of living, inflation, taxation, and other information particular to certain regions and/or demographics from external source 140.

At 306, evaluation server 120 may fill in unknown features for one or more users. Many users may display null values for some traits (i.e., missing data) within data gathered at 304. Accordingly, for such users and traits, bias service 122 may fill in the matrix of financial traits using one or more classical strategies for imputing missing values. For example, bias service 122 may perform multiple imputation by chained equations (MICE) to add values where values are missing from the data gathered at 304. Using MICE, missing values may be imputed based on the observed values for a given individual and the relations observed in the data for other users, assuming the observed variables are included in the imputation model. For example, a user may have certain values for nine out of ten traits, and the tenth value may be missing. Values entered for the tenth trait by users having the similar or same values for the first nine traits may be used to predict the missing tenth trait for this user. This may be performed multiple times, and an average or consistently recurring value may be selected. This may provide a table of financial traits, which may contain a mixture of real and imputed values, for the entire set of users.

At 308, evaluation server 120 may perform a correlation analysis to correlate features. For example, bias service 122 may perform a correlation analysis between confident features, hypothesized features, and/or general financial features, where general financial features may be features that may not have been defined as being indicative of a bias at 302. In order to determine which of the hypothesized features and/or which of the general financial features may be linked to the bias of interest (e.g., present bias as indicated by the aforementioned confident features), bias service 122 may determine Spearman correlations between the values of the confident features, the hypothesized features, and the general financial features of the entire user set. Any trait with positive or negative correlations with the confident features may be included for testing as a possible model input feature. For example, a hypothesized feature of paying bills on the last day they are due may be correlated with a confident loss aversion feature such as purchasing few stocks. On the other hand, a hypothesized feature of paying bills early may fail to be correlated with the confident loss aversion feature. In some embodiments, prior to calculating correlations, bias service 122 may adjust the features to account for differences in income and/or to prevent bias toward users of a particular income level. Some embodiments may calculate correlations in other ways. For example, some embodiments may use Kendall's Tau correlation or other correlation methods that may fit the data depending on underlying data structures. Once correlations are found, both the confident features and the correlated features (or a subset thereof) may be applied to the bias model generation below.

Figure 4:
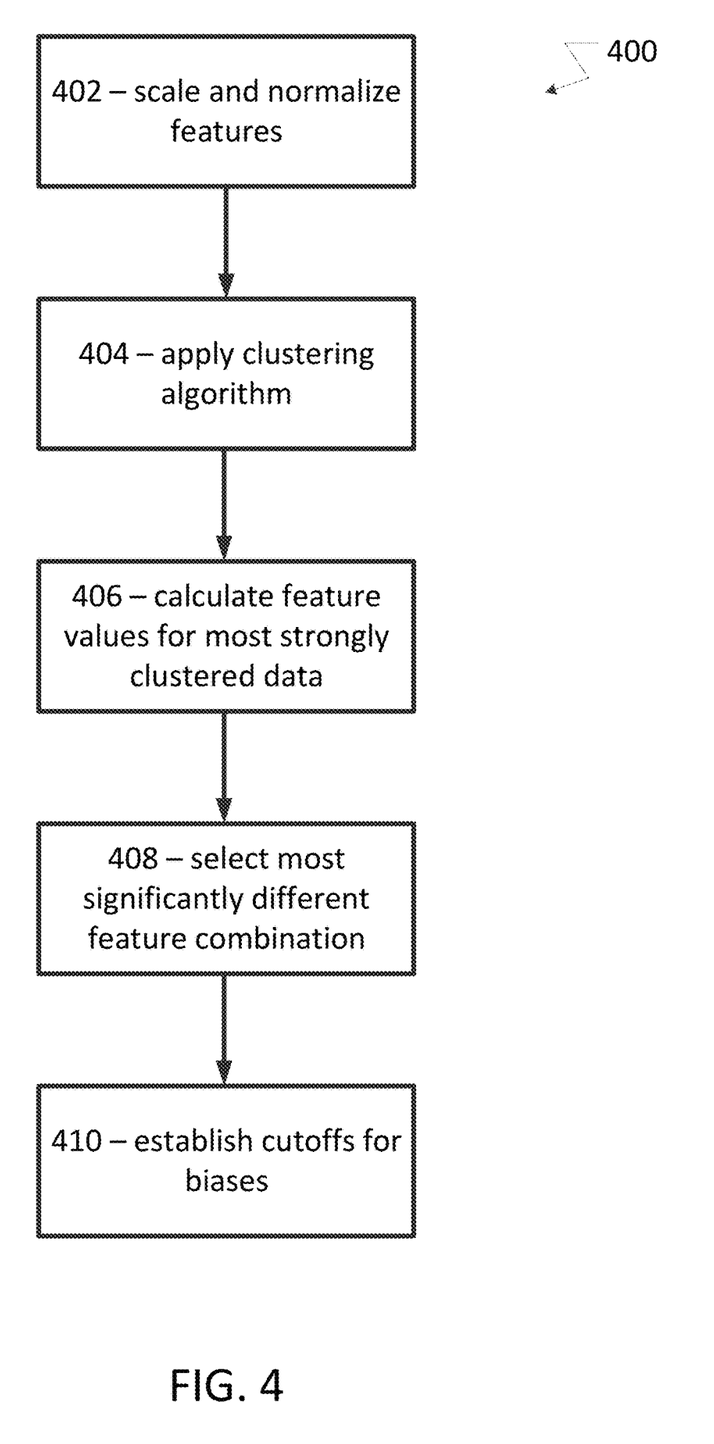
FIG. 4 shows a bias model development process according to an embodiment of the present disclosure.

At 310, evaluation server 120 may generate one or more bias models. For example, bias service 122 may develop bias models through optimizing for maximum differentiation between confident and/or correlated feature values of strongly clustered users. FIG. 4 shows a bias model development process 400 according to an embodiment of the present disclosure. Bias service 122 may perform process 400 at 310 to generate a model. The following example uses present bias, for which there may be two clusters (e.g., "present bias" and "no present bias"), but other models may be generated for different biases, and the other models may have different numbers of clusters.

At 402, bias service 122 may scale and normalize the features gathered at 302-308. For example, bias service 122 may scale a user's spending patterns relative to their income (e.g., a high-income user may spend more on impulsive purchases in total each month than a low income user, but the low income user may spend more on impulsive purchases as a percentage of total income, so the two users' data may be scaled to show a percentage of income spent on impulsive purchases). In another example, bias service 122 may scale a user's tax patterns relative to their income (e.g., value withheld may be the same for two different users, but one user may earn significantly more than the other, so the other, lower-earning user may be withholding a greater share of their paycheck each period). Once the values are scaled, bias service 122 may normalize the values, for example by converting the values to all exist along a same scale (e.g., multiplying all values by one or more constants such that they all are on a 0-1 scale). For example, the respective users' percentage of total income spent on impulsive purchases may fit the 0-1 scale with 0 being 0% of income and 1 being 100% of income, and/or the withholding as a percentage of paycheck may fit the 0-1 scale with 0 being 0% withheld and 1 being 100% withheld.

At 404, bias service 122 may apply a clustering algorithm to the scaled and normalized features. For example, bias service 122 may input the scaled and normalized features to a fuzzy c-means clustering algorithm. A fuzzy algorithm may be used to allow users to not necessarily be assigned strongly to a single cluster (i.e., like in hard clustering where each user is only in one cluster). In fuzzy clustering, a user may possibly appear between both clusters if the data suggests that is most appropriate. However, any clustering algorithm may be used in some embodiments. In the present bias example, fuzzy c-means clustering to produce two cluster centers (e.g., "present bias" and "no present bias") may yield a meaningful model. Other embodiments may use clustering methods, such as hierarchical clustering and/or density-based clustering, which are "hard clustering" methods that may firmly place users in groups lacking or having a specific personality or bias. Other embodiments may use other clustering methods indicating the degree of membership in a cluster (e.g., different fuzzy clustering algorithms), such as Gaussian mixture models.

At 406, bias service 122 may identify the most strongly clustered users. For example, after the clusters are generated, bias service 122 may be able to identify data sets of users who are solidly within one cluster or the other after fuzzy clustering is performed (e.g., counting only users who are clustered as having a degree of membership in a cluster of >0.95). Bias service 122 may calculate and store values of the bias traits (both confident and hypothesized) for the most strongly clustered users. By counting only users with >0.95 membership, bias service 122 may consider the users who have greater than 95% membership in a particular cluster as the "strongly clustered users" and may use these identified users for feature distribution comparisons.

At 408, bias service 122 may select the most significantly different feature combinations for the strongly clustered users. For example, bias service 122 may use T-tests and/or other analyses to measure the difference in the trait values between users strongly in the first cluster and users strongly in the second cluster. Bias service 122 may select a feature combination that results in the most significant difference for the confident and hypothesized features between the clusters. By analyzing the trait distributions in the strongly clustered users, bias service 122 may identify one of the clusters was identified as the present bias cluster due to having higher values (or lower values, when appropriate) for the present bias features. For example, a T-test can determine if there is a significant difference between the means of features exhibited by two groups, where a higher result in the T-test for a given feature can indicate a higher probability that there is a difference between the values of the feature in the two different groups. Some embodiments may use alternatives to the T-test, such as a Mann Whitney U test/Wilcoxon rank-sum test. In one example, specific T-test results indicating significant difference between feature distributions may be as shown in Table 1. Feature data for each cluster may be input into the T-test algorithm and, as shown in Table 1, features having a higher T-test value algorithm output may indicate a lower p-value, which suggests that these features are more likely to be significant indicators of cluster-distinguishing characteristics.

TABLE 1

| Feature | T-test statistic | p-value |
| --- | --- | --- |
| Number of late payments made based on credit history. | 2.34 | 0.02 |
| Value representing how much more the person spent in the days immediately following receipt of paycheck compared to days further away from paycheck | 2.36 | 0.02 |
| Proportion of the person's discretionary expenditures spent on short-term consumables | 3.33 | 0.0009 |
| Variation in the monthly amount that a person adds to their savings account | 3.38 | 0.0007 |
| The ratio of the amount saved to the amount spent in a defined time period | 2.88 | 0.004 |

For example, assume a threshold p-value for significance is 0.001 or a threshold T-test statistic for significance is 3. Accordingly, the features "proportion of the person's discretionary expenditures spent on short-term consumables" and "variation in the monthly amount that a person adds to their savings account" may be selected as features that are likely to indicate a bias, while the other features in Table 1 may be ignored for indicating that a person likely has a bias. This is merely an example for illustration only, and in some embodiments, different features and/or cutoffs may be used, and features may have different T-test statistics and p-values from those given in the table.

At 410, bias service 122 may establish a cutoff degree or other indicator that may be used to say with certainty that a user has a given bias. A user having a score above (or below, as appropriate) a cutoff threshold for a given feature may be more likely to be in one of the bias groups. Bias service 122 may store these thresholds in bias database 124, where they may be available for use in evaluating individual users' biases. Based on a small set of survey results or other background data, a cutoff value may be established. For example, using a cutoff of 0.68 for membership in the non-present bias cluster may select only users that do not have present bias. Setting a cutoff of 0.92 for membership in the present bias cluster may select users that are more likely than not to have present bias. Any cutoff may be used, but some embodiments may use standard cutoff values of 0.8, 0.9, and/or 0.95, for example. Cutoffs may provide some signal that the user has a chance of having a given bias. A combination of multiple features having values above (or below, as appropriate) their respective cutoff thresholds may provide an indication that the user has the bias.

In some embodiments, bias service 122 may establish another indicator for feature cluster membership, such as a continuous variable between 0 and 1 that may be used as an input for other models of user behavior (for example, ad clickthrough propensity or cashflow models, among many others). This type of indicator may be preferable when surfacing customized UI features to biased users, for example.

By performing process 300, evaluation server 120 may develop a model for a bias without the use of any labeled users (i.e., without users pre-labeled as having a given bias). The output of the model may include a degree of membership to a bias cluster (e.g., the present bias cluster) ranging from 0 to 1. For the present bias example, users toward the higher end of the range may have significantly higher values for the present bias traits. Using this method, a similar model can be developed for any cognitive bias or personality trait of interest.

Figure 5:
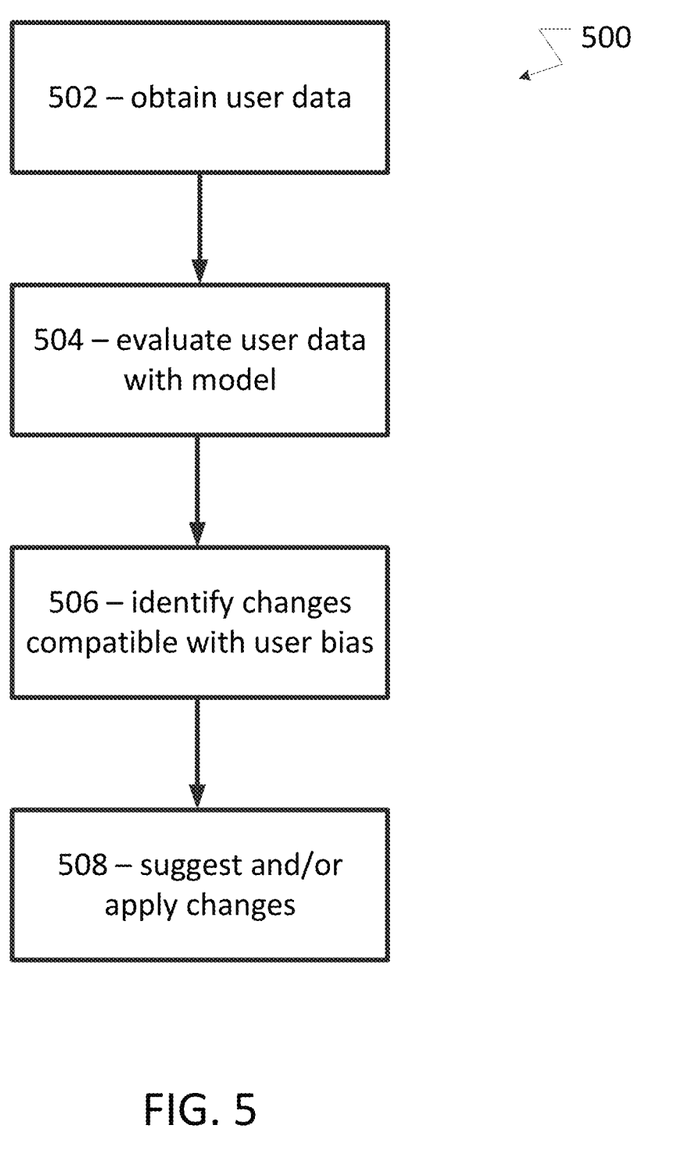
FIG. 5 shows a setting adjustment process according to an embodiment of the present disclosure.

FIG. 5 shows a setting adjustment process 500 according to an embodiment of the present disclosure. Evaluation server 120 and/or financial server 130 may perform process 500 to evaluate a user's biases and implement financial optimizations taking those biases into account. Process 500 is presented as being applied to a single user and a single evaluation of that user for clarity, but process 500 may be repeated for multiple users and/or may be repeated occasionally or periodically for a given user.

At 502, system 100 may obtain data about the user to be evaluated. For example, bias service 122 may gather data about financial transactions made by the user from financial service 132, external source 140, and/or user device 150 through network 110. Data gathering may include interfacing with financial service 132 and/or external source 140 using one or more APIs, for example.

In a specific example, bias service 122 may communicate with financial service 132 to obtain data from financial service 132 that may include expense and transaction details (e.g., receipt level explanation of what goods or services were purchased in a transaction). In some embodiments, bias service 122 may gather the expense and transaction details from other sources (e.g., by communicating with user device 150 having a financial application installed thereon (e.g. PayPal, Venmo, Square, bitcoin wallets, etc.) and/or by communicating with external source 140 storing financial data). Financial institutions and/or applications may record transactions associated with user accounts (e.g., checking accounts, credit card accounts, or the like). The records of the transactions may include not only an amount paid by the user, but also a name of the payee and/or a category of goods and/or services provided by the payee. The categories may include restaurants, bars, grocery stores, gas, travel-related expenses, hotels, events/venues, various types of goods, etc.

In some embodiments, bias service 122 may gather additional data about the user from external source 140 and/or user device 150 through network 110. Data gathering may include interfacing with external source 140 using one or more APIs, for example. Data gathering may include collecting data by one or more local processes of user device 150, which may then send the data to bias service 122, for example. The data may include appointments from calendars, emails, and/or other data from user device 150 The data may include social network data about the user and/or more general data such as government statistics and/or third-party suppled data about cost of living, inflation, taxation, and other information particular to certain regions and/or demographics from external source 140.

At 504, system 100 may evaluate the user data gathered at 502 using one or more models, such as those developed through process 300/400 described above. For example, bias service 122 may scale and normalize the features gathered at 502 in similar fashion to how the features were scaled and normalized for the model generation described above. Bias service 122 may compare the scaled and normalized information to the cutoff thresholds for the bias being evaluated that may be available in bias database 124. For example, system 100 may determine that several of the user's features score highly for present bias based on the comparing, and may therefore label the user as having present bias. Continuing the example of Table 1, if the features "proportion of the person's discretionary expenditures spent on short-term consumables" and "variation in the monthly amount that a person adds to their savings account" have been selected as features that are likely to indicate a bias, and a user has a value of 0.99 for each, the user may be selected for membership in the bias cluster.

At 506, system 100 may identify changes and/or recommendations compatible with the bias identified at 504. For example, bias service 122 may identify one or more predetermined offers or account changes that may be stored in bias database 124 and/or available from financial service 132 that may be labeled as applying to the identified bias. The identification of users with and without a particular cognitive bias or personality trait may be used to provide users with the tips and recommendations that are most appropriate for them and/or to avoid giving irrelevant recommendations. For example, bias database 124 may store data identifying a plurality of predetermined offers and/or account changes. Each of these predetermined offers and/or account changes may be tagged with one or more associated biases in bias database 124. Accordingly, bias service 122 may search bias database 124 for predetermined offers and/or account changes tagged with a bias that matches the bias identified at 504. Some examples may be as follows. For a user with present bias, an automated, system-driven savings plan, or a suggestion for starting a retirement savings account that shows an aged photo of the user, may be effective in helping them save money. For users with loss aversion, who may be hesitant to invest their money even when they stand to make great gains, an offer to start investing while emphasizing how much money they are losing (e.g., the interest they miss out on when they choose not to invest and instead keep their money in a savings account) may be persuasive. For users with extraversion, a financial assistance chatbot may display display more chatty and social behavior, while someone low in extraversion may prefer a chatbot that gets to the point. Users with conscientiousness may be more likely to immediately follow advice they receive, rather than requiring multiple reminders.

System 100 may identify a variety of possible changes to optimize the user's financial situation. Such actions may include periodically moving money from checking to savings, establishing reminders to perform certain account-related and/or finance-related tasks (e.g., money transfers, payments, suggestions to spend more or less on certain types of expenses, etc.), opening credit or banking accounts, and/or other tasks.

At 508, system 100 may suggest and/or apply optimizations identified at 506. In some embodiments, system 100 may notify the user of possible changes to their account and request confirmation of the changes before implementing them. For example, user device 150 may present information about the changes identified by bias service 122 and request user approval. System 100 may apply the identified changes to the user account. For example, if user approves the changes, user device 150 may inform bias service 122 of the approval, and bias service 122 may direct financial service 132 to change the account setting. In some embodiments, bias service 122 may direct financial service 132 to change the account setting proactively (e.g., without user approval). For example, bias service 122 may include an API or other functionality providing access to one or more computing systems of financial service 132. Bias service 122 may also have access to account credentials for the user account (e.g., by prompting the user to enter the credentials through a UI and storing them in a memory). Bias service 122 may be configured to use the API to connect with financial service 132, provide the credentials allowing access to the user account, and modify at least one account setting to apply the identified changes.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of identifying and implementing an account change comprising:
   determining, by a processor, a bias model, the determining including:
      for each of a plurality of cognitive biases, defining at least one behavior associated with the cognitive bias, the at least one behavior exhibited by at least one feature and the at least one behavior affecting a financial preference of individuals having the cognitive bias;
      obtaining modeling financial data for a plurality of users by calling at least one application programming interface (API) of at least one external source;
      processing the modeling financial data to generate modeling feature data for the plurality of users, the modeling feature data indicative of the at least one feature;
      identifying a missing value in the modeling feature data for at least one of the plurality of users;
      determining the missing value based on a set of observed values for the missing value in the modeling feature data;
      adding the missing value to the modeling feature data for the at least one user;
      correlating multiple features included in the modeling feature data to determine which of the multiple features are indicative of the cognitive bias;
      scaling and normalizing the multiple features included in the modeling feature data;
      clustering the modeling feature data into a plurality of clusters by inputting the scaled and normalized features into a clustering algorithm;
      calculating feature values for multiple users having membership in at least one of the plurality of clusters;
      for each cluster in the plurality of clusters, determining one or more bias features of a cognitive bias associated with the cluster based on a statistical difference between a combination of feature values of multiple users having membership in the cluster and the combination of feature values of multiple users having membership in other clusters; and
      for each cluster, determining at least one cutoff value for membership in the cluster, wherein one or more features having a value above the at least one cutoff value indicates membership in the cluster;
   obtaining, by the processor, financial data for a user separate from the plurality of users by calling the at least one API of the at least one external source;
   processing, by the processor, the financial data to generate feature data indicative of the at least one feature;
   comparing, by the processor, the feature data to the at least one cutoff value to determine that the user is a member of one of the plurality of clusters and therefore has the cognitive bias associated with the one of the plurality of clusters;
   in response to the comparing, identifying, by the processor, a change applicable to a financial account of the user, the change being associated with the cognitive bias associated with the one of the plurality of clusters; and
   automatically causing, by the processor, the change to be implemented by a network-accessible financial service, the automatically causing including:
      retrieving stored user credentials for the network accessible financial service;
      connecting to a computing system of the networked accessible financial service using an API;
      using the API to enter the stored user credentials in the networked accessible financial service to gain access to a user account and
      using the API to modify at least one account setting of the user account, wherein modifying the at least one account setting performs an action including at least one of transferring money between two or more accounts, opening a credit or bank account, or making a payment.

2. The method of claim 1, wherein the user is a household user including a plurality of individuals, and the data includes data generated by at least two of the plurality of individuals.

3. The method of claim 1, wherein the clustering is performed using a fuzzy clustering algorithm.

4. The method of claim 1, wherein the correlating multiple features includes:

defining at least one confident feature as a feature that is known to be associated with the cognitive bias;
defining at least one hypothesized feature as a feature that is presumed to be associated with the cognitive bias; and
correlating at least one general feature of the modeling financial feature data with the at least one confident feature by applying a correlation algorithm.

5. The method of claim 4, further comprising verifying, by the processor, that the at least one hypothesized feature is associated with the cognitive bias by applying a correlation algorithm.

6. The method of claim 1, further comprising automatically causing, by the processor, a user interface to suggest a user action configured to improve the user's finances in response to the comparing.

7. A system for identifying and implementing an account change comprising:
a non-volatile memory; and
a processor coupled to the memory, the processor configured to:
determine a bias model, the determining including:
for each of a plurality of cognitive biases, define at least one behavior associated with the cognitive bias, the at least one behavior exhibited by at least one feature and the at least one behavior affecting a financial preference of individuals having the cognitive bias;
obtain modeling financial data for a plurality of users by calling at least one application programming interface (API) of at least one external source;
process the modeling financial data to generate modeling feature data for the plurality of users, the modeling feature data indicative of the at least one feature;
identify a missing value in the modeling feature data for at least one of the plurality of users;
determine the missing value based on a set of observed values for the missing value in the modeling feature data;
add the missing value to the modeling feature data for the at least one user;
correlate multiple features included in the modeling feature data to determine which of the multiple features are indicative of the cognitive bias;
scale and normalize the multiple features included in the modeling feature data:
cluster the modeling feature data into a plurality of clusters by inputting the scaled and normalized features into a clustering algorithm;
calculate feature values for multiple users having membership in at least one of the plurality of clusters;
for each cluster in the plurality of clusters, determine one or more bias features of a cognitive bias associated with the cluster based on a statistical difference between a combination of feature values of multiple users having membership in the cluster and the combination of feature values of multiple users having membership in other clusters; and
for each cluster, determine at least one cutoff value for membership in the cluster, wherein one or more features having a value above the at least one cutoff value indicates membership in the cluster;
obtain financial data for a user separate from the plurality of users by calling the at least one API of the at least one external source;
process the financial data to generate feature data indicative of the at least one feature;
compare the feature data to the at least one cutoff value to determine that the user is a member of one of the plurality of clusters and therefore has the cognitive bias associated with the one of the plurality of clusters;
in response to the comparing, identify a change applicable to a financial account of the user, the change being associated with the cognitive bias associated with the one of the plurality of clusters; and
automatically cause the change to be implemented by a network-accessible financial service, the automatically causing including:
retrieving stored user credentials for the network accessible financial service;
connecting to a computing system of the networked accessible financial service using an API;
using the API to enter the stored user credentials in the networked accessible financial service to gain access to a user account; and
using the API to modify at least one account setting of the user account, wherein modifying the at least one account setting performs an action including at least one of transferring money between two or more accounts, opening a credit or bank account, or making a payment.

8. The system of claim 7, wherein the user is a household user including a plurality of individuals, and the data includes data generated by at least two of the plurality of individuals.

9. The system of claim 7, wherein the clustering is performed using a fuzzy clustering algorithm.

10. The system of claim 7, wherein the correlate multiple features includes:
defining at least one confident feature as a feature that is known to be associated with the cognitive bias;
defining at least one hypothesized feature as a feature that is presumed to be associated with the cognitive bias; and
correlating at least one general feature of the modeling feature data with the at least one confident feature by applying a correlation algorithm.

11. The system of claim 10, wherein the processor is further configured to verify that the at least one hypothesized feature is associated with the cognitive bias by applying a correlation algorithm.

12. The system of claim 7, wherein the processor is further configured to automatically cause a user interface to suggest a user action configured to improve the user's finances in response to the comparing.

* * * * *